US010337898B2

(12) United States Patent
Röhring et al.

(10) Patent No.: US 10,337,898 B2
(45) Date of Patent: Jul. 2, 2019

(54) SENSOR UNIT FOR MEASURING A MASS FLOW RATE OF A LIQUID HOT-MELT ADHESIVE

(71) Applicant: Nordson Corporation, Westlake, OH (US)

(72) Inventors: Sven Röhring, Lüneburg (DE); Ralf Mohrdieck, Escheburg (DE); Helge Lippelt, Lüneburg (DE); Andreas Bornkessel, Adendorf (DE)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/846,163

(22) Filed: Dec. 18, 2017

(65) Prior Publication Data

US 2018/0172494 A1    Jun. 21, 2018

(30) Foreign Application Priority Data

Dec. 21, 2016 (DE) .................... 20 2016 107 242 U

(51) Int. Cl.
*G01F 1/684* (2006.01)
*B05C 5/02* (2006.01)
(Continued)

(52) U.S. Cl.
CPC ............ *G01F 1/6847* (2013.01); *B05C 5/001* (2013.01); *B05C 5/0225* (2013.01);
(Continued)

(58) Field of Classification Search
CPC ........ G01F 1/6847; G01F 1/696; G01F 1/684; G01F 1/69; B05C 5/0254; B05C 11/1007; B05C 5/001; B05C 5/0225
See application file for complete search history.

(56) References Cited

U.S. PATENT DOCUMENTS 6,802,217 B2 * 10/2004 Dennison .................. G01F 1/69
73/204.11
2004/0084486 A1 * 5/2004 Raterman ............... B05C 11/10
222/529

(Continued)

FOREIGN PATENT DOCUMENTS

DE    10 2008 037 206 A1    3/2010
DE    10 2010 015 813 A1    10/2011
WO       2016/122808 A1    8/2016

OTHER PUBLICATIONS

B. Schönteich et al., "Precise mass flow measurement in highly viscous adhesives—virtually without pressure loss," IFS Report of the Institute for Joining and Welding Technology of the Technical University of Braunschweig, edition Jan. 2013, pp. 10-13.

(Continued)

*Primary Examiner* — Donnell A Long
(74) *Attorney, Agent, or Firm* — Baker & Hostetler LLP

(57) ABSTRACT

A sensor unit for measuring a mass flow rate of a liquid hot-melt adhesive is disclosed. The sensor unit includes a flow channel for the hot-melt adhesive, a first temperature measurement device positioned at a first position in the flow channel, a second temperature measurement device positioned at a second position in the flow channel and a heating device assigned to the second temperature measurement device, and a control unit for controlling the heating device and for measuring the mass flow rate. The controller is configured to adjust the temperature of the heating device assigned to the second temperature measurement device to a value, to determine the heating power for heating the heating device assigned to the second temperature measurement device, and to calculate the mass flow rate in the flow channel. The first and second temperature measurement devices are arranged substantially parallel to each other in the flow channel.

20 Claims, 12 Drawing Sheets

(51) Int. Cl.
 *B05C 5/00* (2006.01)
 *G01F 1/69* (2006.01)
 *B05C 11/10* (2006.01)
 *G01F 1/696* (2006.01)

(52) U.S. Cl.
 CPC ........ *B05C 5/0254* (2013.01); *B05C 11/1007* (2013.01); *G01F 1/684* (2013.01); *G01F 1/69* (2013.01); *G01F 1/696* (2013.01)

(56) References Cited

U.S. PATENT DOCUMENTS

| | | | | |
|---|---|---|---|---|
| 2007/0246192 | A1* | 10/2007 | Cunningham | H01L 21/67109 165/96 |
| 2008/0003534 | A1 | 1/2008 | Pahl | |
| 2008/0105709 | A1* | 5/2008 | Schnarr | B25H 3/006 222/146.2 |
| 2008/0302477 | A1* | 12/2008 | Varga | B05C 5/001 156/304.1 |
| 2011/0167895 | A1* | 7/2011 | Hingley | A61L 2/22 73/30.01 |
| 2011/0252881 | A1 | 10/2011 | Glatzel et al. | |
| 2013/0125643 | A1* | 5/2013 | Batty | G01F 1/692 73/204.14 |
| 2013/0157271 | A1* | 6/2013 | Coursey | H05B 1/0297 435/6.12 |
| 2014/0014686 | A1* | 1/2014 | Bacco | B05C 11/1013 222/63 |
| 2014/0138400 | A1* | 5/2014 | Donner | B05C 5/0291 222/1 |
| 2016/0005668 | A1 | | 1/2016 | Donner et al. |

OTHER PUBLICATIONS

B. Schönteich et al., "High-speed Mass Flow Measurement in Highly Viscous Adhesives by Constant Temperature Anemometry," Special Issue on WCARP-V, vol. 51, No. S1, 2015, pp. 269-273.

B. Schönteich et al., "Thermal Mass Flow Measurement of Highly Viscous, Non-Newtonian Polymers," Chem. Ing. Tech, vol. 86, No. 8, 2014, pp. 1241-1248.

European Patent Application No. 17208179.6; Extended Search Report; dated May 25, 2018; 8 pages.

* cited by examiner ure measurement device and the second temperature measurement device are arranged substantially parallelly to one another in the flow channel. The term "substantially parallelly" in this document refers to an exact parallel alignment of the first and the second temperature measurement devices to one another, including deviations of up to ±20° from the exact parallel alignment. By such an alignment and by the shape of the sensors, not only the flow resistance induced by the measurement device but also the occurrence of turbulences in the mass flow is reduced. As a result, the measurement accuracy can be improved compared to the prior art. Furthermore, such a design allows the advantageous grouping and modularization of components; in this respect,

SENSOR UNIT FOR MEASURING A MASS FLOW RATE OF A LIQUID HOT-MELT ADHESIVE

CROSS-REFERENCE TO RELATED APPLICATIONS

This application claims priority to German Patent Application No. DE 202016107242.5, filed Dec. 21, 2016, the disclosure of which is incorporated by reference in its entirety.

FIELD OF THE INVENTION

The present invention relates to a sensor unit for measuring a mass flow of a liquid hot-melt adhesive, comprising a flow channel for the hot-melt adhesive, a first temperature measurement device positioned at a first position in the flow channel for measuring a temperature of the hot-melt adhesive at the first position in the flow channel, a second temperature measurement device positioned at a second position in the flow channel and a heating device assigned to the second temperature measurement device for heating the second temperature measurement device, the second temperature measurement device being used for measuring a second temperature at the second, heated temperature measurement device, and a control unit for controlling the heating device and for measuring the mass flow rate, which is designed and configured to adjust the temperature of the second temperature measurement device to a value and to determine the heating power for heating the second temperature measurement device and to calculate the mass flow rate in the flow channel.

The invention furthermore relates to an application apparatus for dispensing a hot-melt adhesive and to a system for applying liquid hot-melt adhesive, comprising a melter for providing liquid hot-melt adhesive, a heatable application apparatus for dispensing the hot-melt adhesive, a heatable transport device for transporting the hot-melt adhesive from the melter to the application apparatus, and a control system, in particular for adjusting the feed rate of the hot-melt adhesive.

BACKGROUND

Such systems, application apparatuses and such a sensor unit for measuring a mass flow rate in a fluid, such as a hot-melt adhesive, are known in the prior art. Such a sensor unit uses the principle of convection anemometry and requires no direct interference with the mass flow by moving mechanical parts. The measuring principle requires the heating of a temperature measurement device beyond the temperature of the hot-melt adhesive. The temperature of the hot-melt adhesive is determined by means of a further temperature measurement device. Depending on the flow rate of the hot-melt adhesive surrounding the heated temperature measurement device, a larger or lesser amount of heat is released to the fluid flowing around. Using a control unit, the temperature of the heated temperature measurement device is controlled to be a fixed positive value above the temperature of the surrounding hot-melt adhesive. The required heating power and the associated energy consumption are a measure of the flow rate and thus the mass flow of the fluid. An illustration of the measuring principle can be found in the following publication: Schönteich, B., Fischer, F.: Precise mass flow measurement in highly viscous adhesives—virtually without pressure loss [Präzise Massestrommessung in hochviskosen Klebstoffen—nahezu ohne Druckverluste], in: ifs report of the Institute for Joining and Welding Technology of the Technical University of Braunschweig, edition January 2013, pp. 10-13.

The two temperature measurement devices are arranged according to the prior art with a 90° offset along an axis through a flow channel. Furthermore, the sensors are designed as rod-shaped elements.

A disadvantage of the described prior art has the effect that, due to their area, the sensors generate an additional flow resistance in the mass flow, which adversely affects the pump power required to generate a certain amount of hot-melt adhesive and leads to pressure losses within the system. Moreover, the positioning of the sensors creates turbulences in the hot-melt adhesive which can result in uneven fluid exit particularly in the region near the dispensing nozzle, which adversely affects the application quality of hot-melt adhesive onto a substrate or workpiece. In addition, due to the turbulences, accuracy restrictions with respect to the obtained measurement results are possible. Furthermore, the sensors are not easy to maintain as a unit and not easily removable from the housing.

SUMMARY OF THE INVENTION

It is the object of the present invention to provide a sensor unit for measuring the mass flow rate of a liquid hot-melt adhesive, which largely avoids or reduces the disadvantages of the prior art and in particular exerts less influence on the fluid, is easy to manufacture and to position and achieves high measurement accuracy.

According to the invention, the object is achieved by a sensor unit for measuring the mass flow rate of a liquid hot-melt adhesive, comprising: A flow channel for the hot-melt adhesive, a first temperature measurement device positioned at a first position in the flow channel for measuring a temperature of the hot-melt adhesive at the first position in the flow channel, a second temperature measurement device positioned at a second position in the flow channel and a heating device assigned to the second temperature measurement device for heating the second temperature measurement device, the second temperature measurement device being used for measuring a second temperature at the second, heated temperature measurement device, and a control unit for controlling the heating device and for measuring the mass flow rate, which is designed and configured to adjust the temperature of the second temperature measurement device to a value and to determine the heating power for heating the second temperature measurement device and to calculate the mass flow rate in the flow channel. (Claim 1).

In a further aspect, the invention relates to providing an application apparatus and a system with such a sensor unit.

The invention is based on the idea that the first temperature measurement device and the second temperature measurement device are arranged substantially parallelly to one another in the flow channel. The term "substantially parallelly" in this document refers to an exact parallel alignment of the first and the second temperature measurement devices to one another, including deviations of up to ±20° from the exact parallel alignment. By such an alignment and by the shape of the sensors, not only the flow resistance induced by the measurement device but also the occurrence of turbulences in the mass flow is reduced. As a result, the measurement accuracy can be improved compared to the prior art. Furthermore, such a design allows the advantageous grouping and modularization of components; in this respect, the cost advantages that a modularized and grouped design of the sensor unit entails can also be enjoyed. Furthermore, this allows a positioning of the measurement device at different locations in a system for applying liquid hot-melt adhesive.

According to a further aspect of the invention or according to a preferred embodiment, it is provided that the first temperature measurement device and the second temperature measurement device are arranged substantially on the same side of the flow channel. Advantageously, an increase in the measurement accuracy and a reduced flow resistance are also achieved by the arrangement. An advantageous grouping of components is thereby also supported.

According to a preferred embodiment, it is provided that the first temperature measurement device and the second temperature measurement device each comprise a sensor which has a resistance thermometer. Furthermore, according to the invention, at least one of the temperature measurement devices has a heating device, in particular a heatable resistor, the first temperature measurement device and the second temperature measurement device each having sensors which have a ceramic material and a glass passivation. By such a design, an advantageous functional integration is achieved, which allows the formation of flow-favorable sensor shapes, which contribute to the solution of the object according to the invention, in particular to a reduction in resistance.

According to a preferred development, the first temperature measurement device and the second temperature measurement device have a sensor carrier, wherein the sensors are arranged on the sensor carrier. In this way, according to the invention, a modularization of the sensor unit is achieved and, at the same time, a maintenance-friendly removability of the sensor unit is made possible, whereby overall cost savings can be achieved compared to the installation according to the prior art.

Preferably, the first temperature measurement device, the second temperature measurement device and the sensor carrier are inserted into a housing, wherein the housing defines the flow channel. In this case, the housing is preferably heatable by means of at least one electrical heating cartridge and/or has a housing temperature sensor. As a result, the special importance of maintaining a preferred and largely constant processing temperature in the application of a hot-melt adhesive is taken into account.

Preferably, the sensor carrier is attached to the housing by means of a thread, a self-aligning bayonet lock, a press fit or gluing. Depending on the intended use of the sensor unit, either a simple, reversible connection of the components is possible, or an irreversible connection with a high degree of safety against unwanted separation of the components over the product life.

Furthermore, according to a preferred embodiment, the sensor carrier is inserted into an application apparatus, in particular into an application nozzle. This makes it possible to realize the advantage of a component reduction, since a housing section for integrating the sensor unit is already provided by the application apparatus. Furthermore, such a positioning is suitable for further increasing the measurement accuracy with regard to the mass flow rate at the application apparatus. Since there is only a small distance between the sensor and the application apparatus, it can be assumed that the flow rates in the two adjacent regions are approximately identical.

Furthermore, it is proposed according to a preferred embodiment that the sensor carrier is inserted into a hose connection. As a result of such an installation location, the measurement device can also advantageously be inserted into the mass flow of the hot-melt adhesive if, for example, there are space limitations in the region of the application nozzle or if the flow rate of the hot-melt adhesive directly on a hose connection is of interest.

Furthermore preferably, the sensor carrier is formed as an at least partially hollow body, preferably as a pipe, and/or is closed at least partially by a closure element on its side facing away from the sensors, wherein the closure element is preferably connected by means of a screw connection to the sensor carrier, and/or preferably, a sensor block is attached to the sensor carrier on the side of the pipe opposite the closure element, said sensor block being formed on its upper side in such a way that the sensors of the first temperature measurement device and the second temperature measurement device can be inserted at least partially into the sensor block and the sensor block, the sensor carrier and the closure element are formed in such a way that lines can be guided through them. Compared to a solid design of the sensor carrier, such a design results in a material saving, which is at the same time easy to maintain and install. Furthermore, electrical lines can thus be easily guided through the housing.

Preferably, the sensor block is connected force-lockingly and/or by positive engagement to the sensor carrier and the sensor block and/or the sensor carrier is/are filled at least partially with a filler material, in particular with a heat-resistant synthetic resin. By means of the positive connection, not only a sealing effect is achieved, which prevents a transfer of hot-melt adhesive into the sensor housing, but also a secure component fixing. On the one hand, due to the at least partial filling, the sensors and cables are fixed in their place; on the other hand, they are however also protected from unwanted conductive connections due to the insulating properties of the resin.

According to a preferred embodiment, the sensor block is connected to the sensor carrier by means of a thread, by means of a self-aligning bayonet lock, by means of a press fit, or by gluing. Again, depending on the application, such connecting elements allow reversible or irreversible component connections.

In addition, the sensor block and/or the sensor carrier are preferably made of a plastic, preferably of a heat-resistant plastic, more preferably of polyether ether ketone (PEEK). According to the invention, this advantageously results in a weight saving, a limited thermal and electrical conductivity and good processability as well as durability.

Another alternative preferred embodiment is characterized in that the control unit has a unit for entering a control variable, a PID controller, at least one analog-digital converter and at least one digital-analog converter, wherein a temperature difference to be kept constant between the temperature of the second temperature measurement device and the temperature of the first temperature measurement device, in particular a temperature difference of 5 to 50 K, preferably 10 to 15 K, is used as a control variable. The control unit according to the invention allows in particular a fast and stable control of the heating unit by the use of a PID controller to ensure a constant temperature difference between the temperature measurement devices. The said range of temperature differences also allows a high measurement quality with the least possible interference with the temperature field of the hot-melt adhesive at the same time.

Furthermore, the system for applying liquid hot-melt adhesive preferably has the following components: A melter for providing liquid hot-melt adhesive, a heatable application apparatus for dispensing the hot-melt adhesive, a heatable transport device for transporting the hot-melt adhesive from the melter to the application apparatus, a control system, in particular for adjusting the feed rate of the hot-melt adhesive and a sensor unit for measuring the mass flow rate of the hot-melt adhesive. This results in the advantage according to the invention of utilizing the high measurement quality of the sensor unit according to the invention in order to ensure a feed rate of the hot-melt adhesive which corresponds to the desired value in a highly accurate manner.

BRIEF DESCRIPTION OF THE DRAWINGS

In the following, preferred embodiments of the invention are explained with reference to the figures; they show.

DETAILED DESCRIPTION

Figure 1:
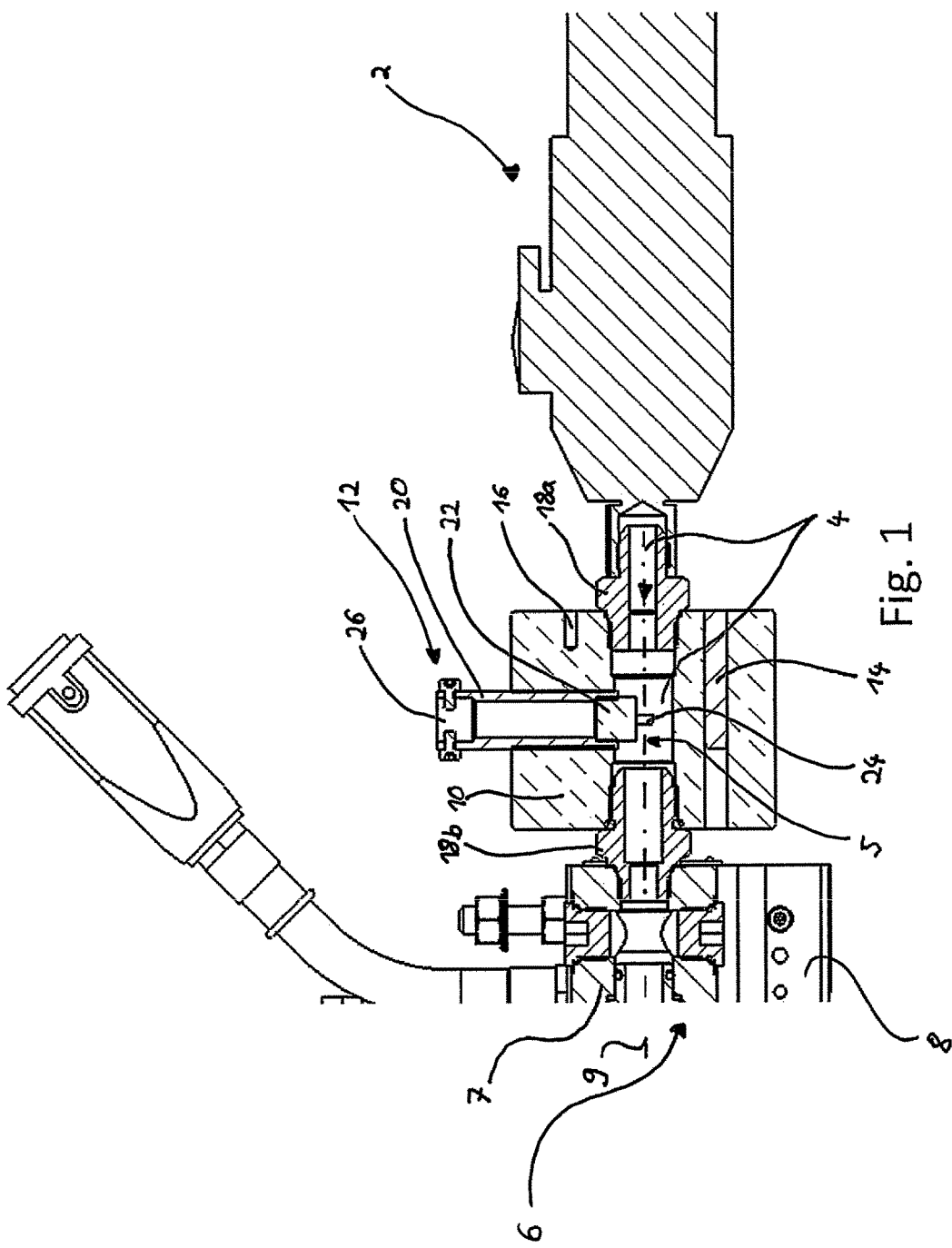
FIG. 1 a section of a system for applying hot-melt adhesive with a sensor unit in a sectional view in a first exemplary embodiment.
Figure 2:
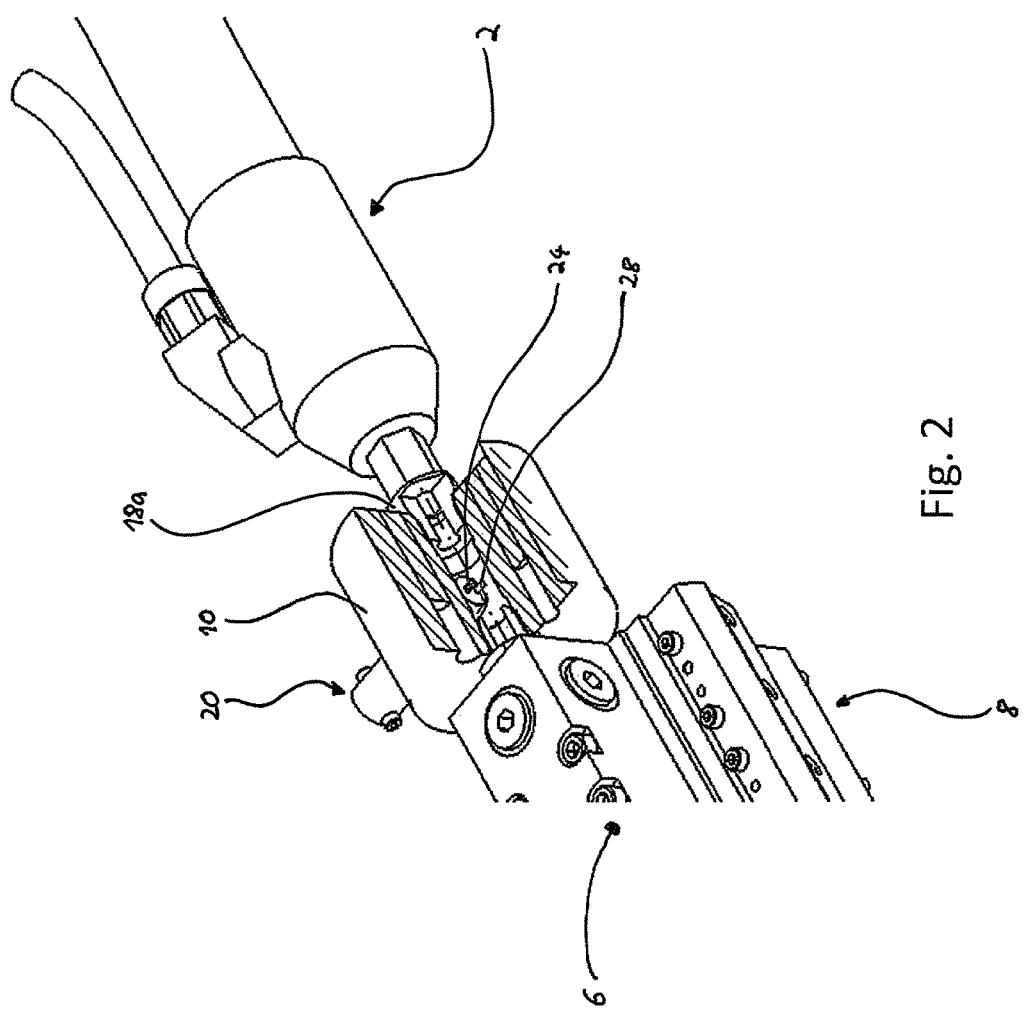
FIG. 2 a section of the system for applying hot-melt adhesive according to FIG. 1 in a perspective view in partial section.

The system illustrated in FIGS. 1 and 2 in a first exemplary embodiment for applying hot-melt adhesive comprises a transport device 2, which transports melted hot-melt adhesive 4 (only indicated here) from a melter 76 (not shown in FIG. 1, see FIG. 11) to an application apparatus 6, a melter 76 (not shown here) (FIG. 11), an application apparatus 6 and a sensor unit 12 for measuring the mass flow rate of a liquid hot-melt adhesive.

The application apparatus 6 has a nozzle arrangement 8 which delivers the hot-melt adhesive 4 to a substrate or workpiece (not shown). The application apparatus 6 comprises, in a manner known per se a housing 7, flow channels formed therein, a valve arrangement and connections for introducing fluid, a control device for controlling the application apparatus and further components.

The sensor unit 12 is arranged in this exemplary embodiment between the application apparatus 6 and the transport device 2 and has a housing 10, which includes and defines a flow channel 5. Screwed into the housing 10 are two connecting pieces 18a and 18b, which allow a reversible connection with the application apparatus 6 and the transport device 2.

On the process side, the hot-melt adhesive 4 passes through the housing 10 in the direction of the arrow 9.

For heating, the housing 10 has a heating cartridge 14, by means of which the housing 10 can be kept at an optimum temperature for processing the hot-melt adhesive 4. A housing temperature sensor (not shown directly) in the corresponding housing bore 16 serves to monitor the temperature of the housing 10.

The sensor unit 12 for measuring the mass flow rate of the liquid hot-melt adhesive 4 is partially arranged in the flow channel 5 of the housing 10. The sensor unit 12 has a sensor carrier 20, a first temperature measurement device 24 and a second temperature measurement device 28. Furthermore, it has a sensor block 22 and a closure element 26.

The first temperature measurement device 24 and the second temperature measurement device 28 are mounted on the sensor block 22. They are arranged so that they partially protrude into the flow channel 5 and thus are in contact with the hot-melt adhesive 4 flowing through it during operation. The first temperature measurement device 24 and the second temperature measurement device 28 are arranged next to each other and parallel to each other. The sensor block 22 in turn is screwed to the sensor carrier 20 and is at least partially closed on the side opposite the sensor block 22 by means of the closure element 26.

Figure 3:
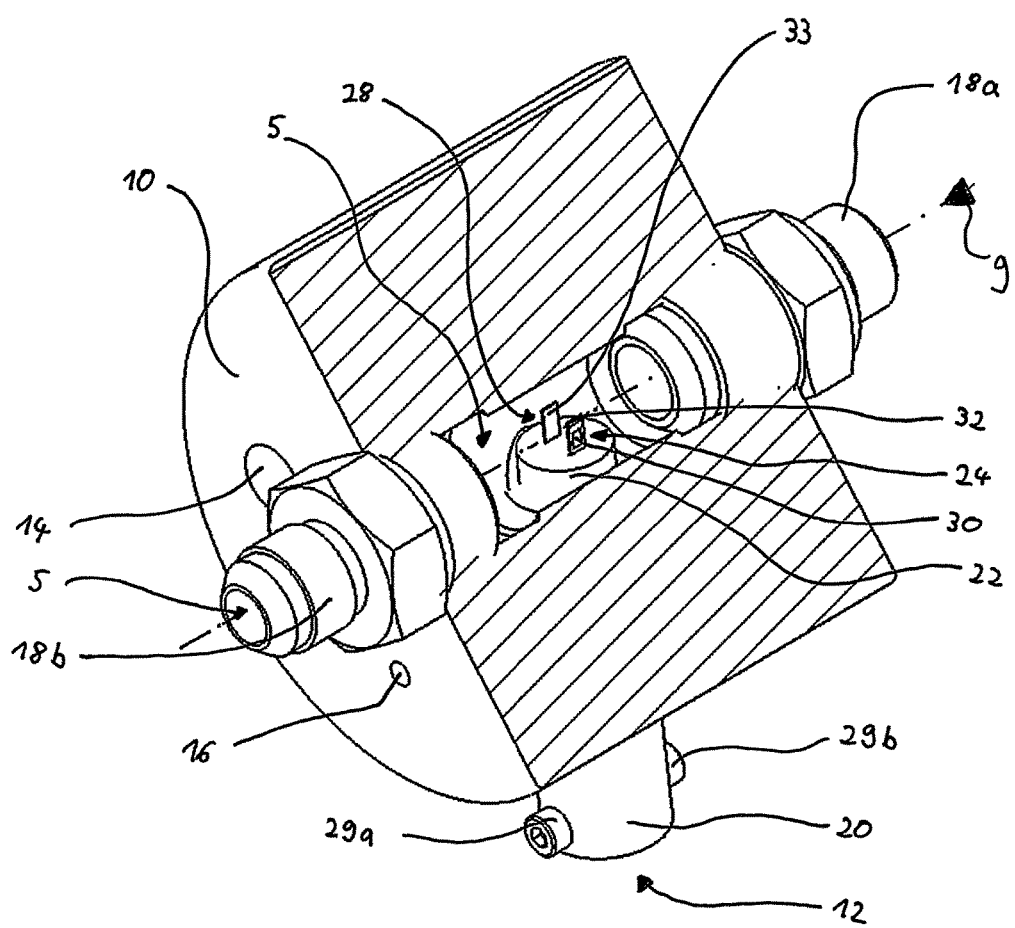
FIG. 3 the sensor unit, inserted into a housing in a perspective view in an alternative exemplary embodiment.

As shown in FIG. 3, each of the temperature measurement devices 24 and 28 has a respective sensor, which is preferably designed as a resistance thermometer 30. At least one of the temperature measurement devices 24 or 28 furthermore has a heatable resistor 32 as a further sensor. In the preferred exemplary embodiment, the first temperature measurement device 24 and the second temperature measurement device 28 are equipped with identical, combined heating and temperature measurement sensors 33. However, the heatable resistor is preferably used only for the second temperature measurement device 28. Consequently, the first temperature measurement device 24 is used exclusively for temperature measurement, whereas the second temperature measurement device 28 is used for measuring the temperature, which is elevated compared to the hot-melt adhesive 4 and which is achieved by the heatable resistor 32.

As can be seen from FIG. 3, the closure element 26 is fastened to the sensor carrier 20 by means of two screws 29a and 29b. In an alternative exemplary embodiment according to FIG. 4, different lines 34 are furthermore guided at least partially through the sensor carrier 20. For fixing the lines and for electrical insulation, both the sensor block 22 and the sensor carrier 20 are partially filled with synthetic resin 36.

Figure 4:
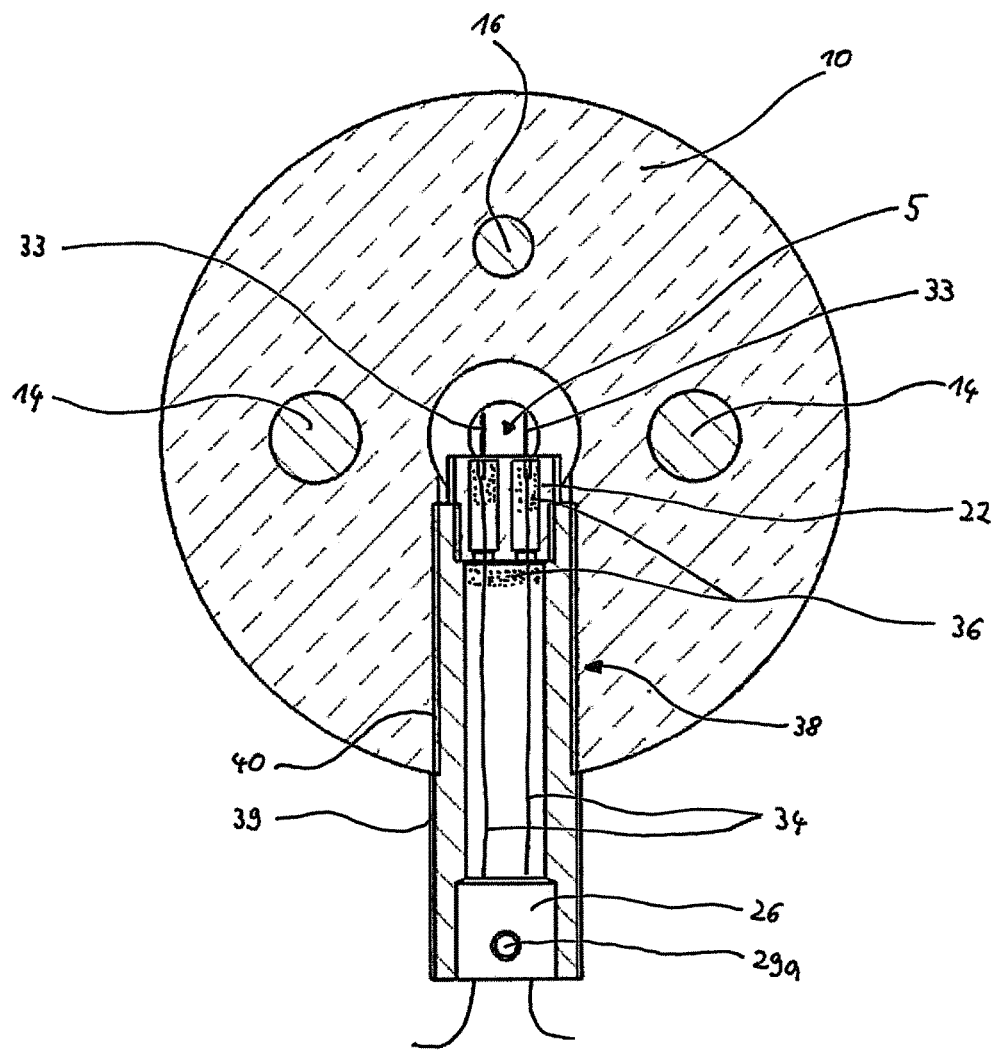
FIG. 4 the sensor unit and the housing in a sectional view with a sectional plane perpendicular to the flow direction of the hot-melt adhesive in an alternative exemplary embodiment.
Figure 5:
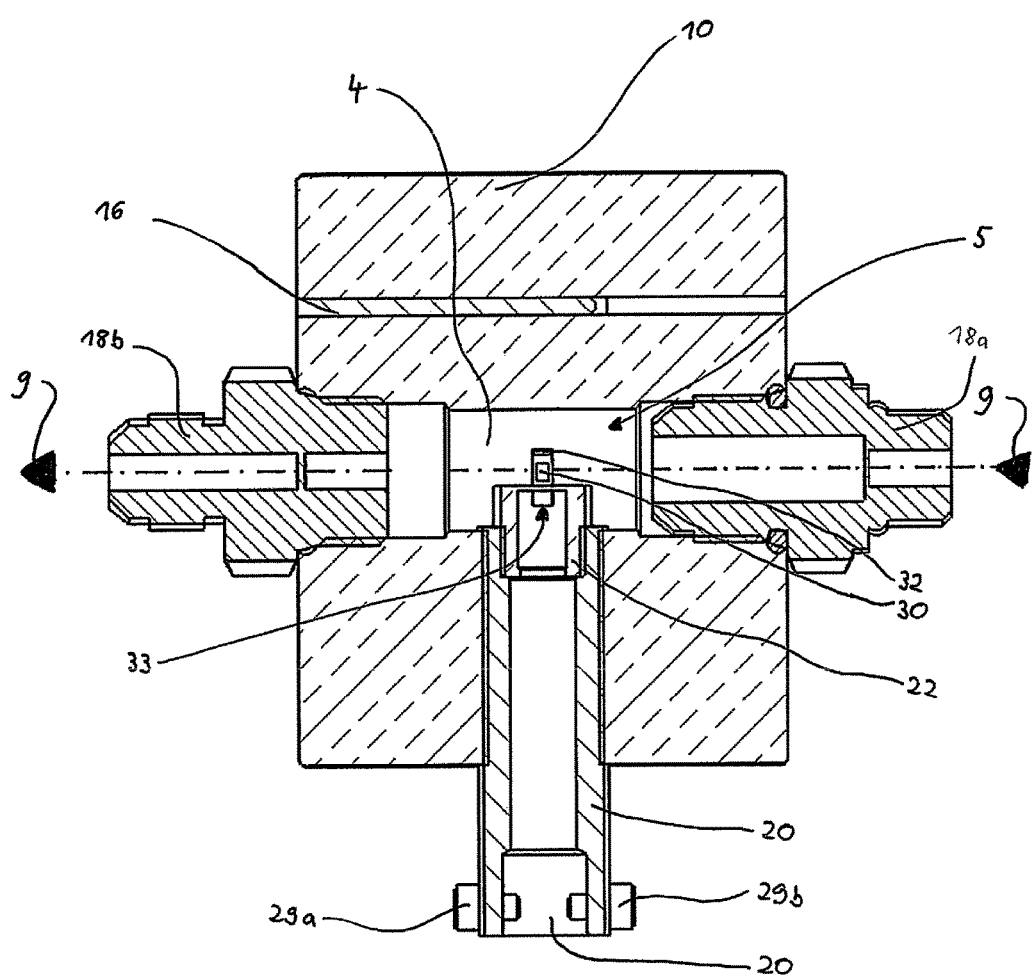
FIG. 5 the sensor unit and the housing according to FIG. 1 in a sectional view with a sectional plane in the flow direction of the hot-melt adhesive.

As shown in FIGS. 4 and 5, the housing 10 has a cylindrical housing bore 38 which has an internal thread 40. The sensor carrier 20 has a corresponding external thread 39 and thus enables a positive connection of the components.

Figure 6:
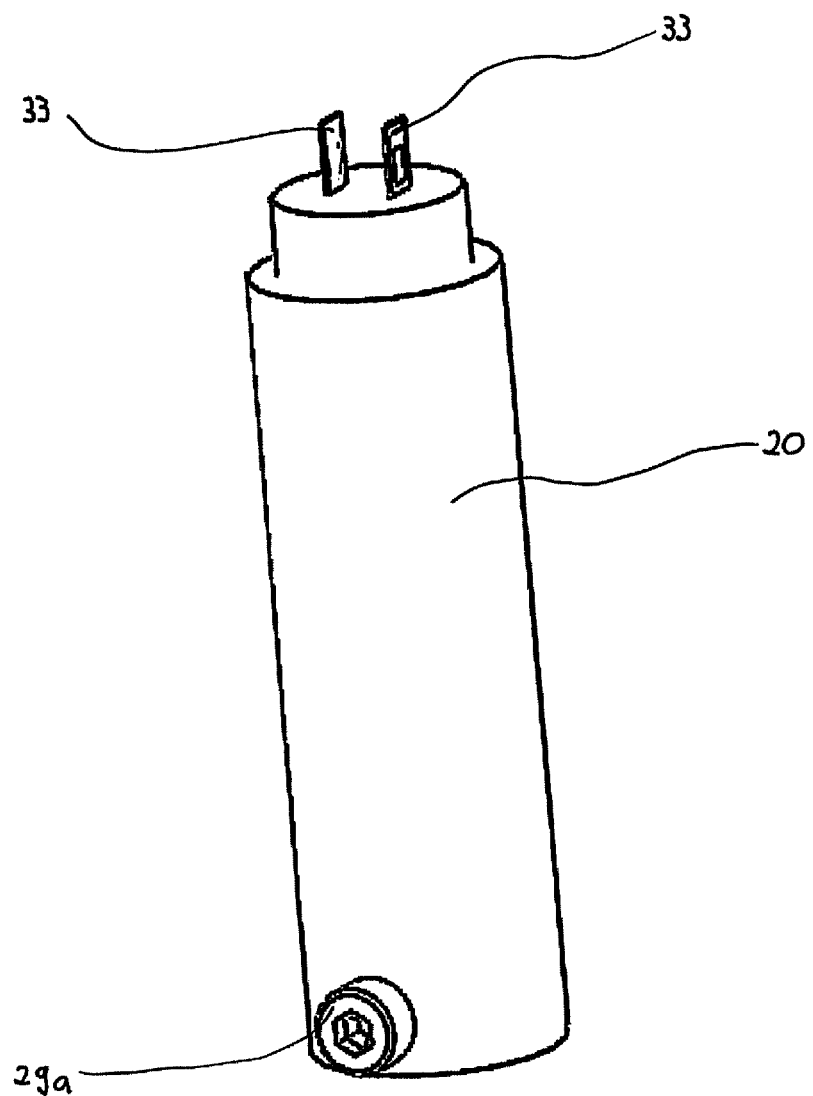
FIG. 6 a perspective view of a sensor carrier in an alternative exemplary embodiment.

Another alternative exemplary embodiment of the sensor carrier 20 is shown in FIG. 6. Here, the sensor carrier 20 has no external thread and can be connected, for example, by means of a press connection with a corresponding housing 10.

Figure 7:
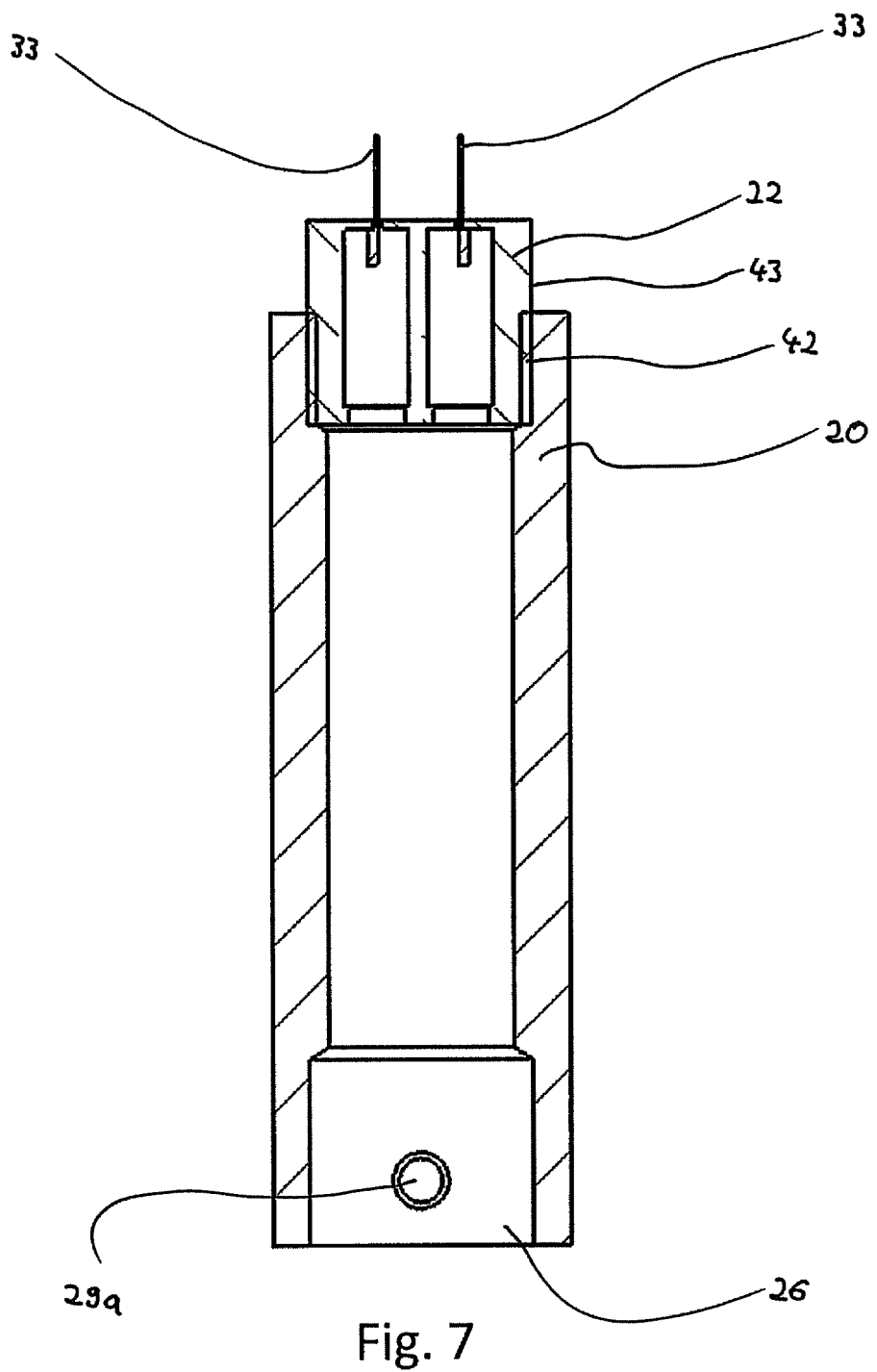
FIG. 7 the sensor carrier in a sectional view with a sectional plane perpendicular to the intended flow direction of the hot-melt adhesive.
Figure 8:
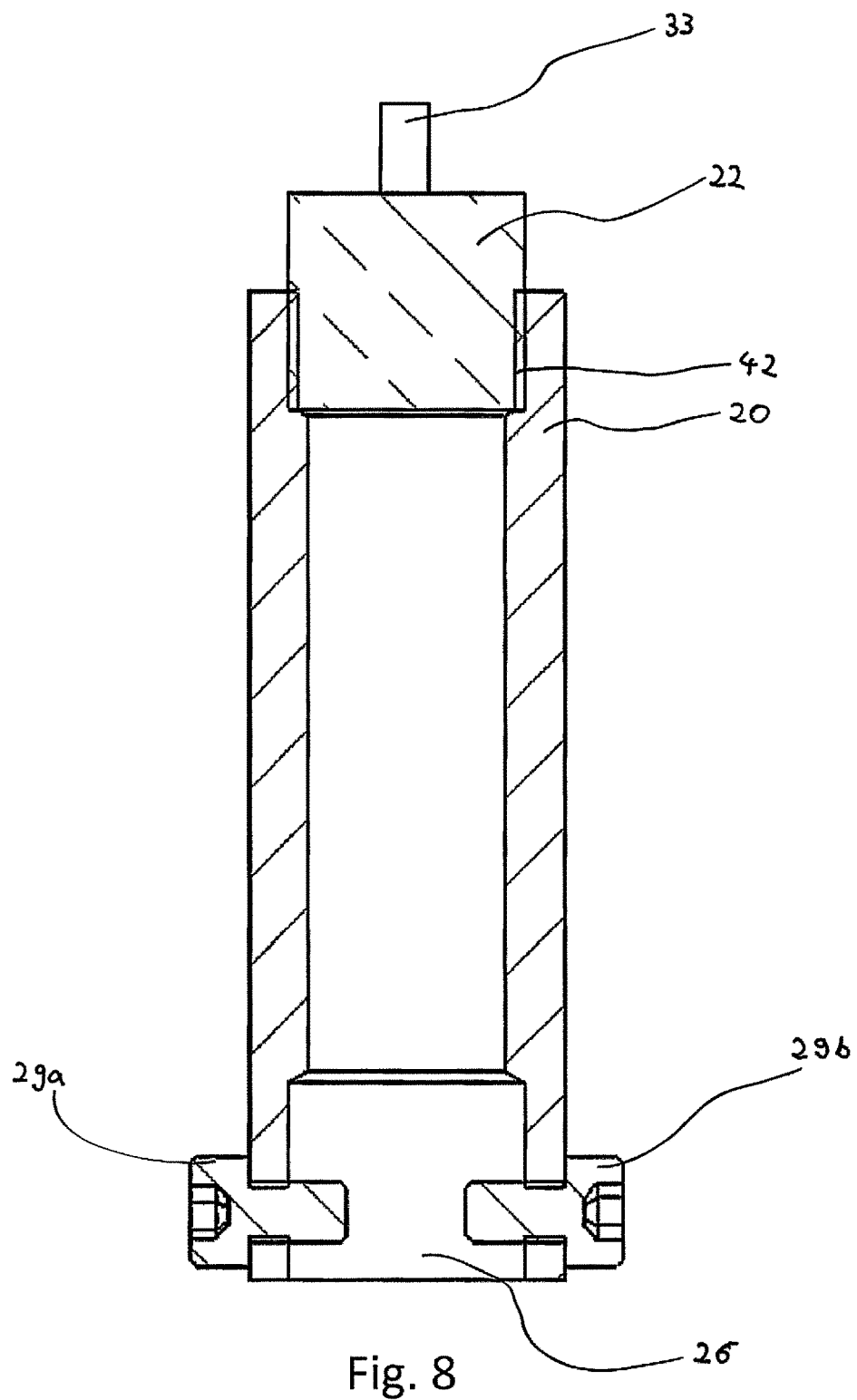
FIG. 8 the sensor carrier in a sectional view with a sectional plane parallel to the intended flow direction of the hot-melt adhesive.

In FIGS. 7 and 8, the sensor carrier 20 is provided with an internal thread 42 on the side opposite the closure element 26. In the exemplary embodiment, the sensor block 22 together with the sensors 24 and 28 has an external thread 43 and can be screwed with the latter's aid into the sensor carrier 20.

Figure 9:
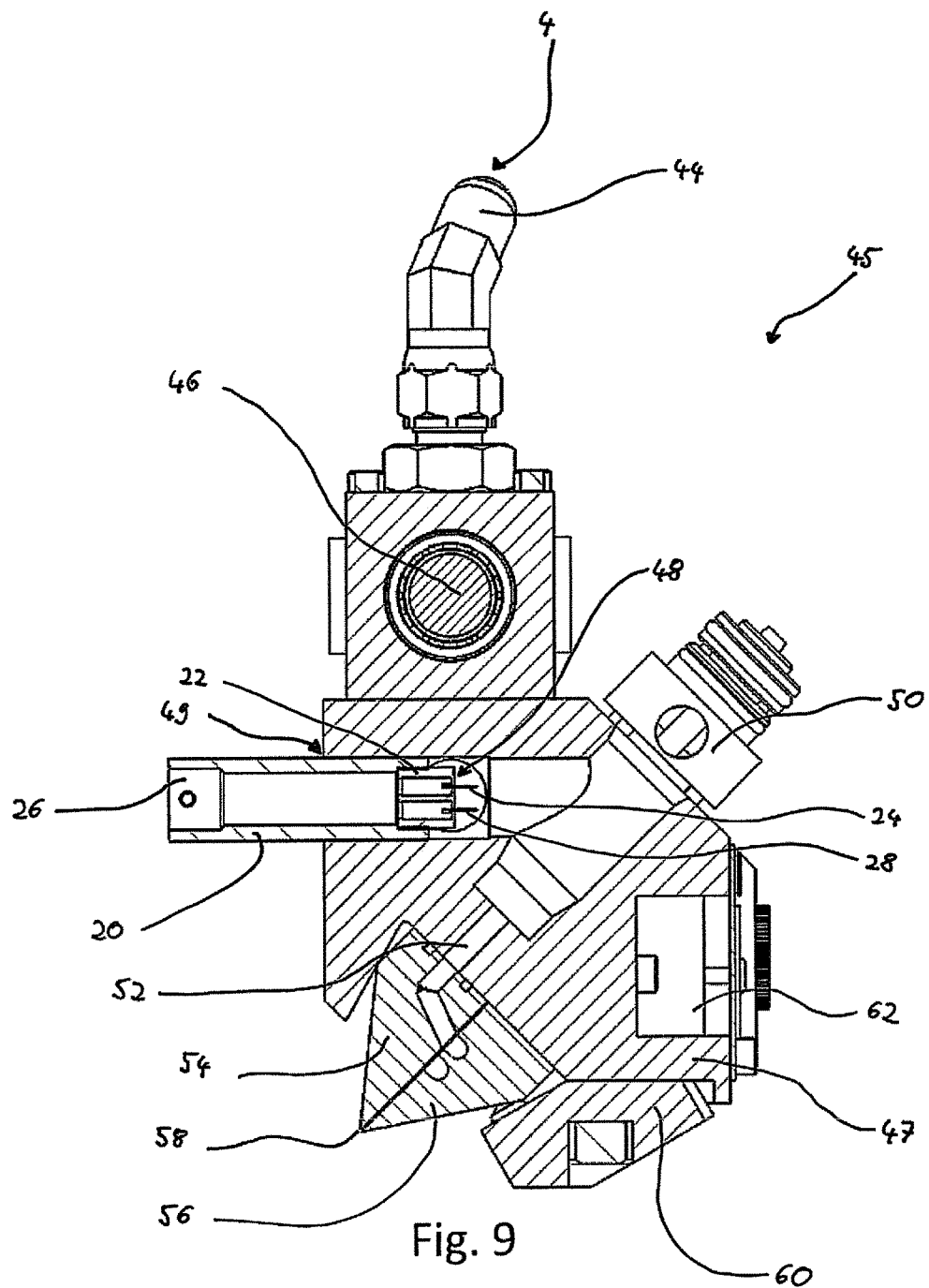
FIG. 9 an application apparatus for liquid hot-melt adhesive with sensor unit attached thereto.

An alternative arrangement of the sensor unit 12 directly in an application apparatus 45 for dispensing hot-melt adhesive 4 is shown in FIG. 9 in the context of a further exemplary embodiment.

The application apparatus 45 comprises a base body 47, on which a pipe 44 for supplying the hot-melt adhesive 4 is arranged. A filter device 46 for filtering the hot-melt adhesive 4 is in fluid connection with the pipe 44. Based on the orientation of the application apparatus 45 in FIG. 9, below the filter device 46, there is a distribution channel 48, which is used to distribute the hot-melt adhesive 4 in the application apparatus 45 perpendicularly to the sectional plane of FIG. 9. The base body 47 of the application apparatus 45 has a cylindrical bore 49 into which the sensor unit 12 is inserted into the base body 47 by means of a press fit, alternatively also by means of a thread, by gluing or by means of a bayonet lock. The first temperature measurement device 24 and the second temperature measurement device 28 thus protrude into the distribution channel 48 in a flow-favorable manner.

A valve 50 for regulating the mass flow of the hot-melt adhesive is further attached to the base body 47. Starting from the valve 50, a channel 52 extends. The channel 52 opens into a slot nozzle 58, which is formed by the nozzle elements 54 and 56. The nozzle elements 54 and 56 are fastened by means of a clamping device 60 to the base body 47 of the application apparatus 45. For receiving electrical components, the application apparatus 47 moreover has a receiving device 62.

On the process side, the hot-melt adhesive 4 thus arrives through a pipe 44 in the application apparatus 45. Subsequently, after passing through a filter device 46, the hot-melt adhesive 4 arrives at a distribution channel 48, which distributes the hot-melt adhesive 4 perpendicularly to the sectional plane in the application apparatus 45. Starting from the distribution channel 48, the hot-melt adhesive 4 arrives through a valve 50 and the channel 52 at the slot nozzle 58 and is discharged to a substrate (not shown here).

Figure 10:
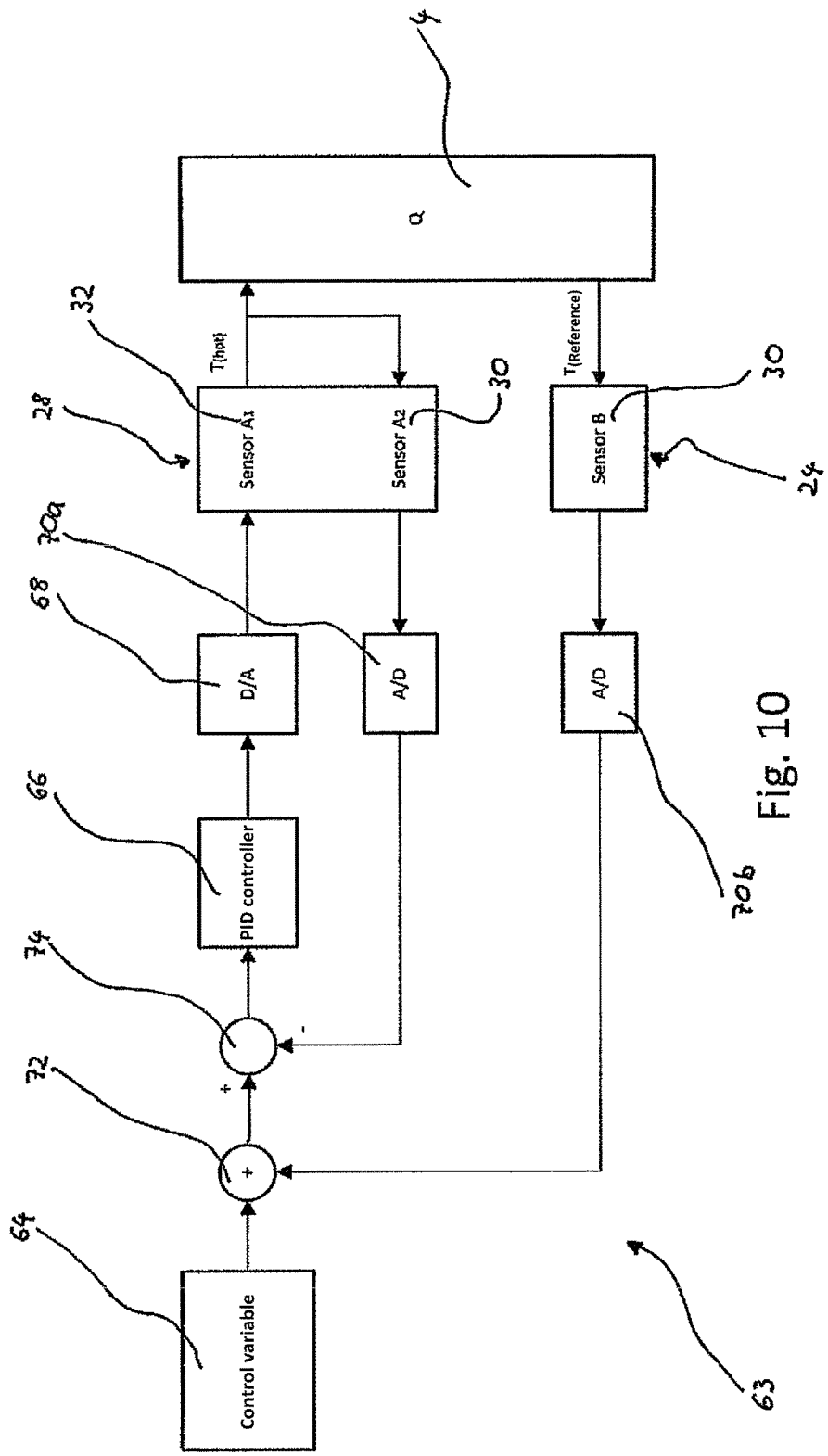
FIG. 10 a control circuit for determining the mass flow rate.

The control unit 63, whose block diagram is shown as a preferred exemplary embodiment in FIG. 10, has a unit 64 for defining a control variable 65, adder elements 72 and 74, a PID controller 66, a digital-analog converter 68 and two analog-digital converters 70a and 70b. It also draws on the first temperature measurement device 24, which has at least one resistance thermometer 30, and on the second temperature measurement device 28, which has a resistance thermometer 30 and a heatable resistor 32. The sensors 30 and 32 of the temperature measurement devices 24 and 28 are inserted into the mass flow of the hot-melt adhesive as described.

An object of the controller 66 is to keep constant the control variable 65, and thus the desired differential temperature of the second temperature measurement device 28 above the temperature of the surrounding hot-melt adhesive 4. For this purpose, the heating power at the heatable resistor 32 is appropriately controlled, wherein both the temperature measured value with respect to the surrounding hot-melt adhesive 4 via the first temperature measurement device 24 and the temperature measured value of the second temperature measurement device 28 are returned to the controller 66. The converters 68 and 70a and 70b are used to convert digital signals into analog signals and vice versa. The electrical power absorbed by the heatable resistor 32 is a measure of the mass flow of the hot-melt adhesive.

Figure 11:
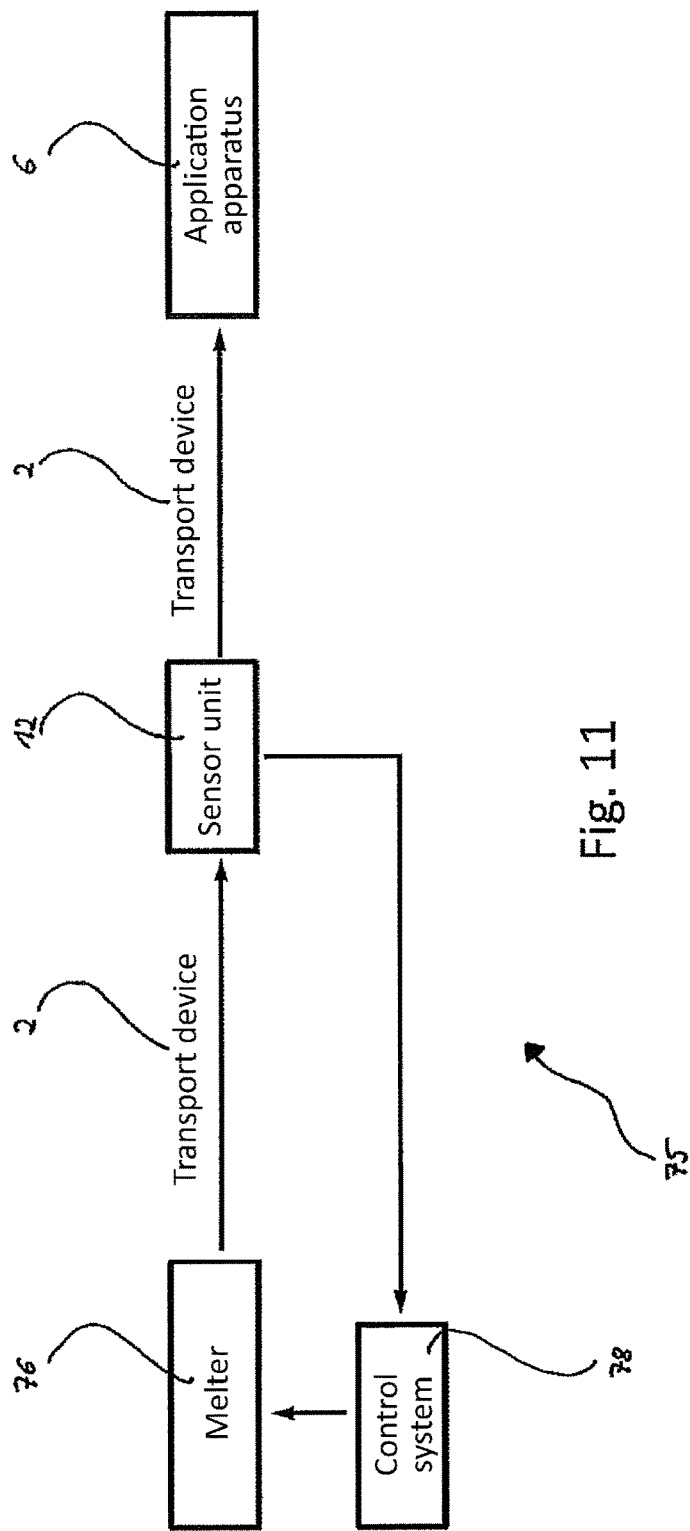
FIG. 11 a system for applying liquid hot-melt adhesive.

The sensor unit 12 is preferably part of a system 75 for applying hot-melt adhesive 4, as shown in FIG. 11. The system 75 contains a melter 76 which serves to convey and melt the hot-melt adhesive 4. Furthermore, said system 75 contains the sensor unit 12, which serves to measure the mass flow rate and is located at any position between the melter and the application apparatus, or also, as shown in FIG. 10, within the application apparatus. In addition, the system 75 has an application apparatus 6 and a control system 78 and the transport device 2.

The hot-melt adhesive 4 is conveyed to the application apparatus 6 via the transport device 2. The sensor unit 12 is configured to carry out the measurement of the mass flow rate of the hot-melt adhesive. Information about the measured mass flow rate is fed to a control system 78 and serves to control the conveyor in the melter 76.

Figure 12:
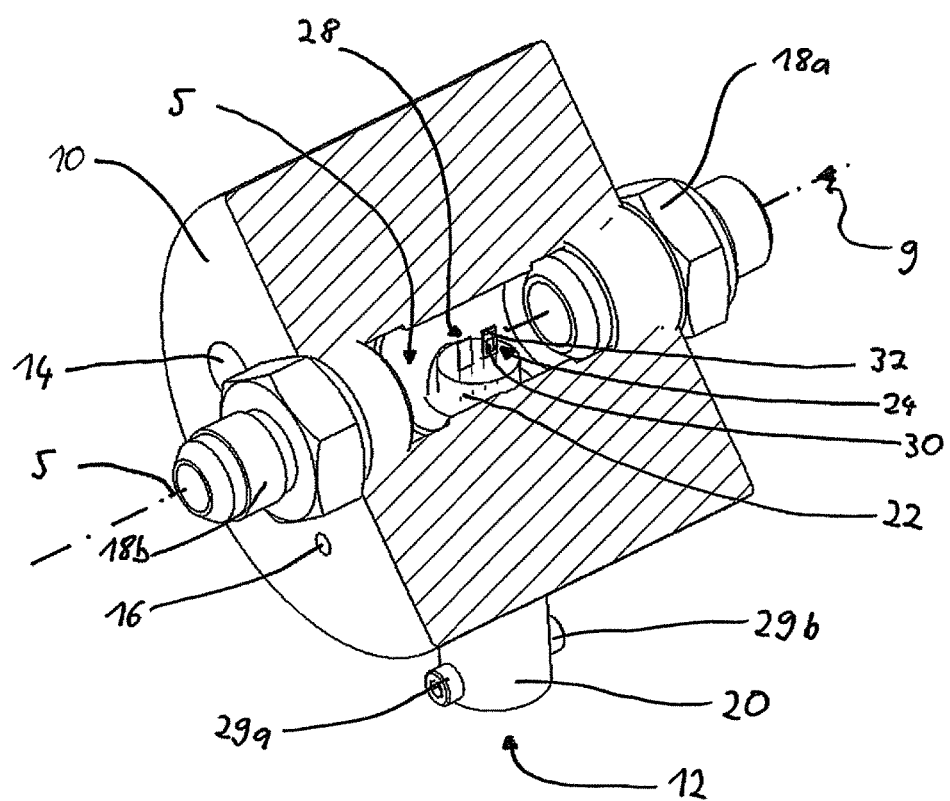
FIG. 12 an alternative exemplary embodiment of the sensor unit, inserted into a housing.

FIG. 12 shows an alternative exemplary embodiment of the sensor unit 12, in which the first temperature measurement device 24 and the second temperature measurement device 28 are arranged in the flow direction 9 in the flow channel 5 one behind the other relative to the flow direction 9. This is achieved in the exemplary embodiment by a respective arrangement of the first temperature measurement device 24 and the second temperature measurement device 28 on the sensor block 22. With regard to a description of the other components, reference is made to the relevant explanations with regard to FIG. 3, wherein identical components are provided with the same reference symbols.

LIST OF REFERENCE SYMBOLS USED

2 Transport device
4 Hot-melt adhesive
5 Flow channel
6 Application apparatus
7 Housing
8 Nozzle arrangement
9 Flow direction
10 Housing
12 Sensor unit
14 Heating cartridge
16 Housing temperature sensor (not directly shown) in corresponding housing bore
18a,b Connecting pieces
20 Sensor carrier
22 Sensor block
24 First temperature measurement device
26 Closure element
28 Second temperature measurement device
29a,b Screws
30 Resistance thermometer
32 Heatable resistor
33 Combined heating and temperature measurement sensors
34 Lines
36 Synthetic resin
38 Housing bore
39 External thread
40 Internal thread
42 Internal thread
43 External thread
44 Pipe
45 Application apparatus
46 Filter device
47 Base body
48 Distribution channel
49 Recess
50 Valve
52 Channel
54,56 Nozzle elements
58 Slot nozzle 60 Clamping device
62 Receiving device
63 Control unit
64 Unit for entering a control variable
65 Control variable
66 PID controller
68 Digital-analog converter
70a,b Analog-digital converter
72,74 Adder elements
75 System for applying hot-melt adhesive
76 Melter
78 Control system

The invention claimed is:

1. A sensor unit for measuring a mass flow rate of a liquid hot-melt adhesive, the sensor unit comprising:
    a flow channel configured to receive the liquid hot-melt adhesive;
    a first temperature measurement device positioned at a first position in the flow channel, wherein the first temperature measurement device is configured to measure a first temperature of the liquid hot-melt adhesive at the first position in the flow channel;
    a second temperature measurement device positioned at a second position in the flow channel and a heating device assigned to the second temperature measurement device, wherein the heating device is configured to heat the second temperature measurement device, and the second temperature measurement device is configured to measure a second temperature at the second temperature measurement device; and
    a control unit configured to control the heating device and measure the mass flow rate, the control unit being further configured to adjust the temperature of the heating device assigned to the second temperature measurement device to a value, to determine a heating power for heating the heating device assigned to the second temperature measurement device, and to calculate the mass flow rate in the flow channel,
    wherein the first temperature measurement device and the second temperature measurement device are arranged substantially parallel to each other in the flow channel.

2. The sensor unit according to claim 1,
wherein the first temperature measurement device and the second temperature measurement device are arranged substantially on a same side of the flow channel.

3. The sensor unit according to claim 1,
wherein the first temperature measurement device and the second temperature measurement device each have a sensor comprising a resistance thermometer.

4. The sensor unit according to claim 1,
wherein the heating device is a heatable resistor.

5. The sensor unit according to claim 1,
wherein the first temperature measurement device and the second temperature measurement device each have sensors comprising a ceramic material and a glass passivation.

6. The sensor unit according to claim 1,
wherein the first temperature measurement device and the second temperature measurement device have a sensor carrier and the first and second temperature measurement devices are arranged on the sensor carrier,
wherein the first and second temperature measurement devices each have a sensor.

7. The sensor unit according to claim 6,
wherein the first temperature measurement device, the second temperature measurement device, and the sensor carrier are inserted into a housing, wherein said housing defines the flow channel.

8. The sensor unit according to claim 7,
wherein the housing is configured to be heated by at least one electrical heating cartridge or has a housing temperature sensor.

9. The sensor unit according to claim 6,
wherein the sensor carrier is fixed to a housing by a screw thread, a self-aligning bayonet lock, a press fit, or by gluing.

10. The sensor unit according to claim 6,
wherein the sensor carrier is configured to be inserted into an application nozzle of an application apparatus.

11. The sensor unit according to claim 6,
wherein the sensor carrier is configured to be inserted into a hose connection.

12. The sensor unit according to claim 6,
wherein the sensor carrier has a body that is at least partially hollow.

13. The sensor unit according to claim 6,
wherein the sensor unit is closed at least partially by a closure element on a side facing away from the sensor of each of the first and second temperature measurement device, and wherein the closure element is screwed to the sensor carrier.

14. The sensor unit according to claim 13,
wherein the sensor unit is a sensor block fixed to the sensor carrier opposite the closure element, said sensor block being formed such that the sensor of the first temperature measurement device and the sensor of the second temperature measurement device are configured to be inserted at least partially into the sensor block.

15. The sensor unit according to claim 14,
wherein the sensor block is connected force-lockingly or by positive engagement to the sensor carrier, and the sensor block is filled at least partially with a heat-resistant material.

16. The sensor unit according to claim 14,
wherein the sensor block is connected to the sensor carrier by a thread, a self-aligning bayonet lock, a press fit, or by glue.

17. The sensor unit according to claim 14,
wherein the sensor block or the sensor carrier are made of a heat-resistant plastic.

18. The sensor unit according to claim 1,
wherein the control unit has a unit for inputting a control variable, a PID controller, at least one analog-digital converter and at least one digital-analog converter, wherein a temperature difference to be kept constant between the second temperature of the second temperature measurement device and the first temperature of the first temperature measurement device is the control variable.

19. An application apparatus for dispensing hot-melt adhesive, the application apparatus comprising:
    the sensor unit for measuring the mass flow rate of the hot-melt adhesive according to claim 1.

20. A system for applying liquid hot-melt adhesive, the system comprising:
    a melter configured to provide liquid hot-melt adhesive;
    a heatable application apparatus configured to dispense the liquid hot-melt adhesive;
    a transport device configured to transport the liquid hot-melt adhesive from the melter to the heatable application apparatus;
    a control system the configured to adjust a feed rate of the liquid hot-melt adhesive; and the sensor unit for measuring the mass flow rate of the liquid hot-melt adhesive according to claim 1.

* * * * *